United States Patent Office 3,553,595
Patented Jan. 5, 1971

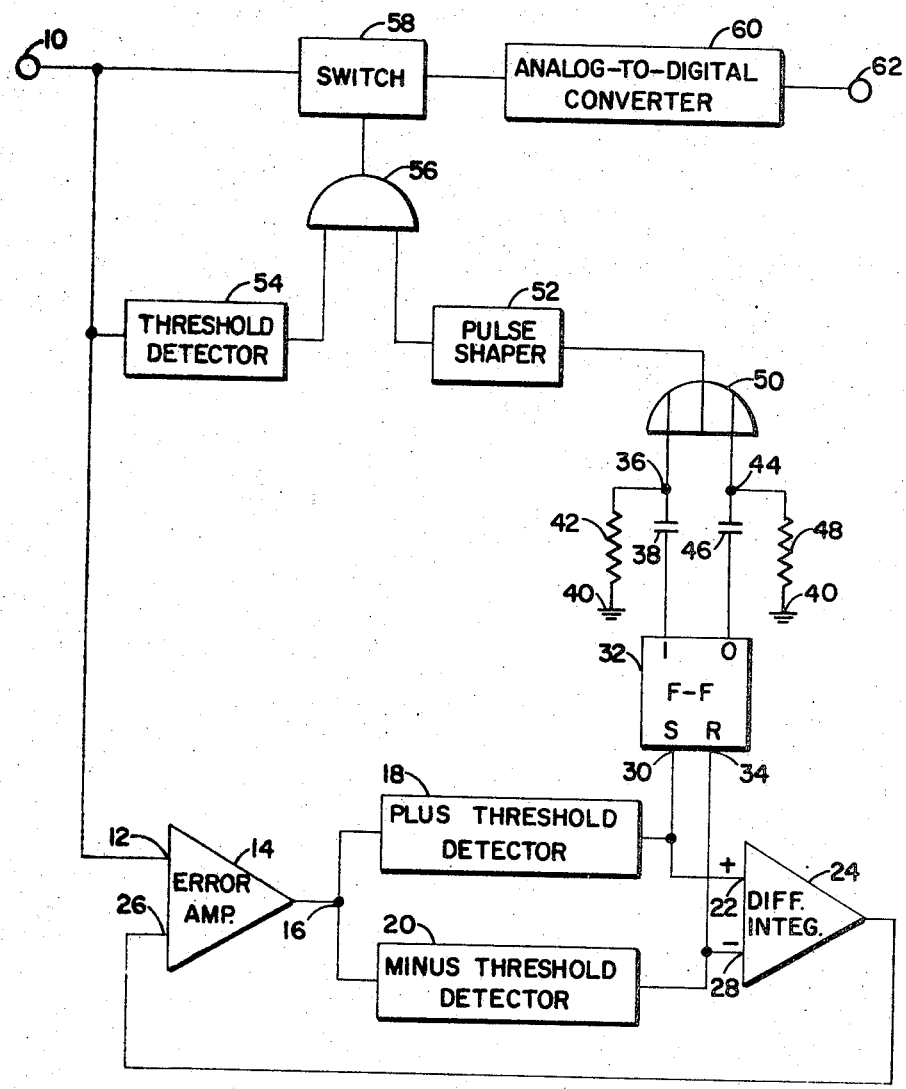
FIG. I

3,553,595
CONTROL APPARATUS
Dale M. Walsh, Clearwater, Fla., assignor to Honeywell Inc., Minneapolis, Minn., a corporation of Delaware
Filed July 28, 1967, Ser. No. 656,844
Int. Cl. H03k 17/00
U.S. Cl. 328—151                                                6 Claims

ABSTRACT OF THE DISCLOSURE

A circuit for detecting maximum and minimum points of an input signal is shown.

Figure 2A:
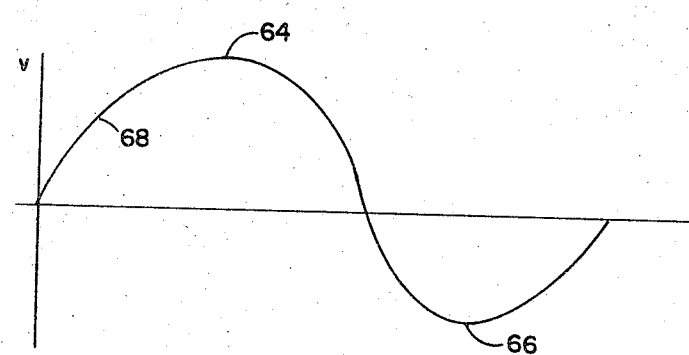

The input signal is tracked by a tracking loop which provides output pulses of a polarity or sense which indicates whether the input signal is increasing or decreasing. A bistable circuit is triggered by the output pulses which reverse the state of the bistable circuit when the output pulses indicate a reversal of the slope of the input signal.

SUMMARY OF THE INVENTION

The invention herein described was made in the course of or under a contract or subcontract thereunder with the Department of the Army, U.S. Army Electronics Command.

It is often necessary or desirable to locate the maximum and minimum points of an input signal. One example of where it is necessary to locate such points is when the speech signal or a similar signal is being encoded for transmission. The signal can be encoded by taking samples at predetermined points in time such as in ordinary pulse code modulation. Alternatively, the signal can be encoded by sampling only at the maximum and minimum points of the signal and encoding the samples. An article by M. V. Mathews, "Extremal Encoding for Speech Transmission," IRE Transactions on Information Theory, September 1959, pp. 129–136, illustrates how a speech signal can be encoded by sampling at the maximum and minimum points. However, in order to sample a signal at the maximum and minimum points, it is necessary to first locate such maximum and minimum points.

In general, the prior art method of determining maximum and minimum points of a signal is by differentiating the signal. When the derivative is equal to zero, the signal is either at a maximum or minimum point. In speech signals the frequencies of interest are, for example, approximately 300 hertz to 3,000 hertz. However, since differentiators are narrow band devices, it is virtually impossible to design a satisfactory differentiator which will conveniently differentiate over this entire frequency range.

This invention overcomes the limitations of the prior art by providing a method of determining maximum and minimum points of a signal without differentiating the signal. For the purposes of this specification. the maximum and minimum points of a signal are defined as the extremities of the signal which is further defined as the points at which the derivative of the signal changes polarity or sense. The input signal is applied to a tracking or rebalance loop which generates a feedback signal that tracks the input signal. The feedback signal and the input signal are supplied to an error sensor such as an error amplifier. The error amplifier provides an output signal indicative of the magnitude and polarity of the error. This output signal is applied to a detector which triggers to provide an output pulse when the error exceeds a predetermined magnitude. The output pulse is indicative of the polarity of the error between the input signal and the feedback signal. The output pulse from the detector is used to adjust the feedback signal to compensate for the error. When a maximum or a minimum point of the input signal is reached, the polarity of the error signal will be changed. Since the output pulses from the detector are indicative of the polarity of the error, the output pulses are used to determine when the error signal changes polarity. Thus, the change in polarity of the error signal is indicative of a maximum or minimum point of the input signal and the maximum or minimum points can be determined from the output pulses from the detector.

Accordingly, it is an object of this invention to provide a new and novel means for determining when a signal reaches a maximum or minimum point.

Figure 2B:
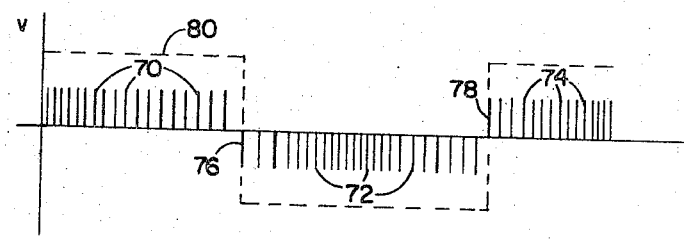
Figure 2C:
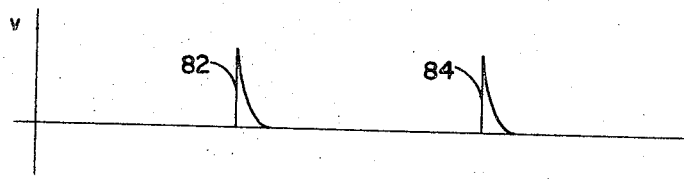
Figure 3:
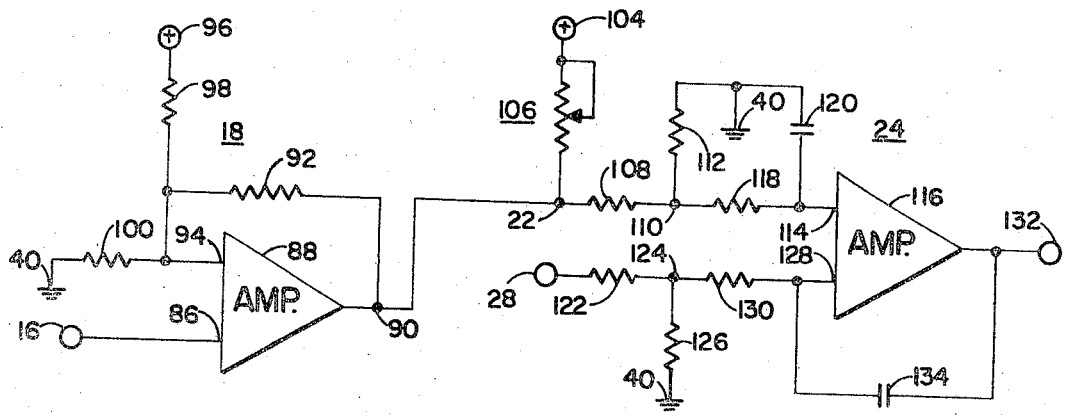

Other objects and advantages of this invention will become evident to those skilled in the art upon a reading of this specification and the appended claims in conjunction with the drawings, of which:

FIG. 1 is a block and schematic diagram of this invention;

FIGS. 2A, 2B, and 2C illustrate various waveforms to aid in explaining FIG. 1; and FIG. 3 is a schematic diagram of a portion of FIG. 1 in greater detail.

DETAILED DESCRIPTION OF THE INVENTION

In FIG. 1 there is shown an input means or terminal 10 connected to a first input 12 of an error detecting or sensing means, comparison means, or error amplifier 14 which has an output connected to a junction point 16. Junction point 16 is connected to an input of a plus threshold detector 18 and to an input of a minus threshold detector 20. An output of detector 18 is connected to a first input 22 of an integrating means or differential integrator 24 which as an output connected to a second input 26 of error amplifier 14. An output of detector 20 is connected to a second input 28 of differential integrator 24. Amplifier 14, detectors 18 and 20, and integrator 24 comprise a tracking means or rebalance means.

The output of detector 18 is connected to a set input 30 of a bistable means or flip-flop 32. The output of detector 20 is connected to a reset input 34 of flip-flop 32. A first output or "1" output of flip-flop 32 is connected to a junction point 36 by means of a capacitor 38. Junction point 36 is connected to a common conductor or ground 40 by means of a resistor 42. Capacitor 38 and resistor 42 comprise an elementary differentiating means for differentiating the "1" output signal from flip-flop 32. A second output or "0" output of flip-flop 32 is connected to a junction point 44 by means of a capacitor 46. Junction point 44 is connected to ground 40 by means of a resistor 48. Capacitor 46 and resistor 48 comprise a second elementary differentiating means. Junction points 36 and 44 are connected to first and second inputs of an OR gate 50 which has an output connected to an input of a pulse shaper 52. Pulse shaper 52 can be, for example, a one-shot or monostable multivibrator which provides an output pulse of a predetermined amplitude and duration each time it is triggered by a pulse from OR gate 50. Flip-flop 32, the associated differentiators, OR gate 50, and pulse shaper 52 comprise a detecting or sensing means for sensing when the output signal of error amplifier 14 changes polarity.

Input terminal 10 is further connected to an input of a threshold detector 54 which has an output connected to a first input of an AND gate 56. An output of pulse shaper 52 is connected to a second input of AND gate 56. An output of AND gate 56 is connected to an input of switch means 58. Input terminal 10 is connected to a second input of switch 58 which has an output connected to an input of analog-to-digital converter 60. An output of converter 60 is connected to an output terminal 62.

To understand the operation of the FIG. 1 assume that a signal represented by waveform 68 of FIG. 2A is present at input terminal 10. The waveform of FIG. 2A has a maximum point at 64 and a minimum point at 66. Assume that the portion of waveform 68 that occurs prior to maximum point 64 is present at terminal 10 and input 12 of error amplifier 14. Since the input signal is increasing, a positive error signal is provided at junction point 16 and at the input of plus threshold detector 18. When the error signal becomes equal to the threshold level of detector 18, detector 18 triggers and provides an incrementing signal or output pulse. This output pulse is integrated by integrator 24 to increase the feedback signal at input 26 of error amplifier 14. As the feedback signal increases, the error signal at junction point 16 decreases to zero. When the error signal decreases to zero, the output pulse from detector 18 ends. Since the input signal is increasing, the error signal again increases to the threshold level of detector 18 so that another output incrementing pulse is provided by detector 18. This output pulse is again integrated by integrator 24 to adjust or increase the feedback signal at input 26 or error amplifier 14. The output pulses from detector 18 are illustrated by pulses 70 of FIG. 2B. Integrator 24 has a relatively long time constant so that between pulses from detector 18 it holds the feedback signal at a substantially constant level.

After maximum point 64 is passed, the input signal starts to decrease so that the feedback signal is now greater than the input signal. Thus, the polarity of the error signal at junction points 16 changes to a negative error signal. As the error signal increases in a negative direction, minus threshold detector 20 triggers to provide an incrementing signal or output pulse when its threshold level is reached. The output incrementing pulses from detector 20 are integrated by integrator 24 in the same manner as the output pulses from detector 18 were integrated; however, the integrator 24 decreases the feedback signal each time an output pulse from detector 20 occurs. As the feedback signal decreases, the error signal at junction point 16 also decreases. When the error signal reaches zero volts, the output pulse from detector 20 ends and integrator 24 holds the feedback at a substantially constant level. Since the input signal is still decreasing, the error signal at junction point 16 increases in a negative direction until detector 20 provides another output pulse. The output pulses from detector 20 are illustrated by pulses 72 of FIG. 2B.

When the input signal reaches minimum point 66, the polarity of the error signal at junction point 16 again reverses and detector 18 provides output pulses 74 of FIG. 2B. Threshold detector 18 and integrator 24 are shown in greater detail in FIG. 3 and will be explained more fully hereinafter.

The output pulses from detectors 18 and 20 are applied to inputs 30 and 34 respectively, of flip-flop 32. As long as the input signal is increasing, detector 18 provides output pulses to set input 30. The first of these pulses switches flip-flop 32 to its "1" or set state and all subsequent pulses from detector 18 have no effect on the state of flip-flop 32.

When maximum point 64 of the input signal is reached, the output pulse from detector 18 ends and the next pulse is pulse 76 from detector 20. Pulse 76 is applied to input 34 of flip-flop 32 which resets flip-flop 32. Each subsequent pulse from detector 20 has no effect on the state of flip-flop 32. Detector 20 continues to provide output pulses 72 until minimum point 66 of the input signal is reached. As the input signal starts to increase, detector 18 provides an output pulse 78 which is applied to input 30 of flip-flop 32 to set flip-flop 32. Each subsequent pulse from detector 18 has no effect with the state of flip-flop 32.

The output signal from flip-flop 32 is a square wave 80 illustrated in FIG. 2B. Square wave 80 is the output from the "1" side of flip-flop 32. The output from the "0" side of flip-flop 32 is the logical inverse of square wave 80.

When maximum point 64 is reached, square wave 80 goes from a high or positive voltage level to a low or negative voltage level. This change in potential is differentiated by capacitor 38 and resistor 42 to provide a negative going pulse at junction point 36. Simultaneously the "0" ouput of flip-flop 32 goes from a low or negative voltage level to a high or positive voltage level. This voltage change is differentiated by capacitor 46 and resistor 48 to provide a positive going pulse at junction point 44. This positive pulse is illustrated by pulse 82 of FIG. 2C. Pulse 82 is coupled through OR gate 50 to the input of pulse shaper 52. Pulse shaper 52 provides an output pulse of uniform amplitude and of a predetermined width each time it is triggered by an input pulse.

When minimum point 66 of the input waveform is reached, pulse 78 causes flip-flop 32 to change states so that the output signal of flip-flop 32 on the "1" output goes from a low or negative voltage level to a high or positive voltage level. This voltage change is differentiated by capacitor 38 and resistor 42 to provide a positive going pulse 84 at junction point 36 which is coupled through OR gate 50 to the input of pulse shaper 52. Pulse shaper 52 provides an output pulse the same as was described above. Simultaneously, a negative pulse appears at junction point 44. In the embodiment shown in FIG. 1 the negative pulses at junction points 36 and 44 are not used and do not affect the operation of the circuit. Thus, a positive pulse at junction point 36 indicates that the input signal has reached a maximum point 64 and a positive pulse at junction point 44 indicates that the input signal has reached a minimum point 66.

The input signal is also applied to a threshold detector 54. Threshold detector 54 can be a circuit such as a Schmidt trigger which changes state when the input signal is above a particular threshold level. When the input signal is less than the threshold level, threshold detector 54 provides an output signal which inhibits AND gate 56. Thus, AND gate 56 inhibits output pulses from pulse shaper 52. When the input signal level exceeds the threshold level of detector 54, AND gate 56 is enabled so that the output pulses from pulse shaper 52 are coupled through AND gate 56 to switch 58. The purpose of threshold detector 54 is to prevent the circuit from triggering due to noise and very low level signals. Threshold detector 54 is not necessary for the operation of the circuit but is used to improve performance.

Pulses from AND gate 56 close switch 58 so that the input signal at terminal 10 is sampled by switch 58. The samples are transmitted to analog-to-digital converter 60 which provides a digital output signal at output terminal 62. The digital output signal is indicative of the magnitude and polarity of the input signal at maximum and minimum points. Switch 58 can be a simple transistor switch such as an FET transistor or a similar switching circuit.

In FIG. 3 threshold detector 18 and integrator 24 are shown in greater detail. Junction point 16 is connected to a first input 86 of an amplifier 88 which has an output 90 connected to input 22 of integrator 24. Output 90 is further connected by means of a resistor 92 to a second input 94 of amplifier 88. Input 94 is connected to a source of positive potential 96 by means of a resistor 98 and is further connected to ground 40 by means of a resistor 100. Detector 20 is similar to detector 18.

Input 22 of integrator 24 is connected to a source of positive potential 104 by means of a potentiometer 106 and is further connected by a resistor 108 to a junction point 110. Junction point 110 is connected to ground 40 by means of a resistor 112 and is further connected to an input 114 of an amplifier 116 by means of a resistor 118. Input 114 is connected to ground by means of a capacitor 120. Resistors 108, 112, and 118 comprise a voltage divider to adjust the output voltage of detector 18 to a level that can be accepted by the amplifier 116 input. Potentiometer 106 and source 104 provide an adjusting means to balance the input of integrator 24 to null integrator drift.

Input 28 of integrator 24 is connected by means of a resistor 122 to a junction point 124. Junction point 124 is connected to ground 40 by means of a resistor 126 and is further connected to an input 128 of amplifier 116 by means of a resistor 130. Amplifier 116 has an output 132 which is connected by means of a capacitor 134 to input 128. Resistors 122, 126, and 130 comprise a voltage divider to adjust the output signals from threshold detector 20. Capacitor 124 provides integrating feedback so that amplifier 116 integrates pulses applied at inputs 114 and 128. Output 132 of amplifier 116 is connected to input 26 of amplifier 14 of FIG. 1.

Assume that an error signal is applied at junction point 16. Further assume that the error signal is increasing. The threshold level of the threshold detector 18 is determined by source 96, resistor 98, resistor 100. As long as the error signal is less than the threshold voltage, amplifier 88 will provide an output signal at output 90 which is not integrated by integrator 24. In one embodiment of this invention the threshold of detector 18 was set at one volt so that an error signal greater than 1 volt caused amplifier 88 to provide an output pulse at output 90. Once the error signal applied at input 86 exceeds the threshold level, feedback through resistor 92 locks or latches amplifier 88 so that the output pulse continues even through the signal at input 86 drops below the threshold level. When the signal at input 86 falls below another predetermined threshold level amplifier 88 will revert to its initial state. In the above mentioned embodiment of this invention this second threshold level was set at zero volts.

When amplifier 88 switches to provide an output pulse at output 90, integrator 24 integrates this output pulse to increase the feedback level applied to input 26 of amplifier 14 of FIG. 1. As is mentioned above, integrator 24 keeps increasing the feedback level until the error signal at junction point 16 drops to zero volts and amplifier 88 switches to its initial state.

In the above mentioned embodiment of this invention amplifiers 14 and 116 were Fairchild uA702 integrated amplifiers and amplifier 88 was a Fairchild uA710 integrated amplifier. An amplifier similar to amplifier 88 was used in minus threshold detector 20.

While I have shown and described one embodiment of my invention, it will be evident to those skilled in the art that various modifications can be made to my invention. Accordingly, I do not wish to be limited by the specific embodiments shown and described but only by the scope of the appended claims.

I claim as my invention:

1. Apparatus for detecting extremities of an input signal comprising, in combination:
   input means for receiving the input signal;
   tracking means for generating a feedback signal which is incremented in response to an incrementing signal when the difference between the feedback signal and the input signal exceeds a predetermined threshold level, said incrementing signal being indicative of the sense of the difference;
   sensing means connected to said tracking means for receiving said incrementing signal and for providing an output signal when said incrementing signal indicates a change in sense of the difference between the feedback signal and the input signal, said sensing means including, bistable means connected to said tracking means, said bistable means having first input means and second input means connected to receive said incrementing signal and further having first and second states, said incrementing signal being operable to switch said bistable means to said first state when the difference between the feedback signal and the input signal is of a first sense and to switch said bistable means to said second state when the difference between the feedback signal and the input signal is of a second sense and pulsing means connected to said bistable means for providing said output signal when said bistable means changes states; and
   output means connected to said sensing means for receiving said output signal, said output means including switch means connected to said pulsing means and to said input means for receiving the input signal, said output signal from said pulsing means operating to close said switch means to sample the input signal and means connected to said switch means to receive the samples of the input signals.

2. Apparatus as defined in claim 1 wherein said tracking means includes a comparison means having a first input connected to said input means for receiving the input signal and a second input, said comparison means providing an error signal indicative of the difference between signals received at said first and second inputs;
   threshold detecting means connected to said comparison means for receiving said error signal and for providing said incrementing signal, said incrementing signal including first and second pulses; and
   integrating means connected to said threshold detecting means and to said second input of said comparison means for integrating said first and second pulses to provide said feedback signal.

3. Apparatus for detecting extremities of an input signal comprising, in combination:
   input means for receiving the input signal;
   tracking means for generating a feedback signal which is incremented in response to an incrementing signal when the difference between the feedback signal and the input signal exceeds a predetermined threshold level, said incrementing signal being indicative of the sense of the difference, said tracking means including a comparison means having a first input connected to said input means for receiving the input signal and a second input, said comparison means providing an error signal indicative of the difference between signals received at said first and second inputs, a threshold detecting means connected to said comparison means for receiving said error signal and for providing said first incrementing signal, said incrementing signal including first and second pulses, and integrating means connected to said threshold detecting means and to said second input of said comparison means for integrating said first and second pulses to provide said feedback signal;
   sensing means connected to said tracking means for receiving said incrementing signal and for providing an output signal when said incrementing signal indicates a change in sense of the difference between feedback signal and input signal; and
   means responsive to said sensing means and said input means for passing the input signal when the voltage of the signal at said input means exceeds a predetermined value.

4. Apparatus for detecting maximum and minimum points of an input signal comprising, in combination:
   input means for providing the input signal;
   comparison means connected to said input means to receive said input signal and further connected to receive a feedback signal, said comparison means for providing an error signal indicative of the difference between said input signal and said feedback signal;
   detector means connected to said comparison means for generating output pulses when said error signal exceeds a predetermined threshold, said output pulses being indicative of the sense of the difference between said input signal and said feedback signal;
   integrator means connected to said detector means for integrating said output pulses;
   means connecting said integrator means to said comparison means;
   sensing means connected to said detector means for receiving said output pulses, said sensing means providing output signals when the sense of the difference between said input signal and said feedback signal changes; and means responsive to said sensing means and said input means for passing the input signal when the voltage of the signal at said input means exceeds a predetermined value.

5. Apparatus as defined in claim 4 wherein said sensing means includes bistable means connected to said detector means for receiving said output pulses, said output pulses operating to reverse the state of said bistable means when the sense of the difference between said input signal and said feedback signal changes whereby the output signal from said bistable means is indicative of the sense of the difference between said input signal and said feedback signal; and differentiating means connected to said bistable means for differentiating said output signal from said bistable means.

6. Apparatus for detecting maximum and minimum points of an input signal comprising, in combination:

input means for providing the input signal;

comparison means connected to said input means to receive said input signal and further connected to receive a feedback signal, said comparison means for providing an error signal indicative of the difference between said output signal and said feedback signal;

detector means connected to said comparison means for generating output pulses when said error signal exceeds a predetermined threshold, said output pulses being indicative of the sense of the difference between said input signal and said feedback signal;

integrator means connected to said detector means for integrating said output pulses;

means connecting said integrator means to said comparison means;

sensing means connected to said detector means for receiving said output pulses, said sensing means providing output signals when the sense of the difference between said input signal and said feedback signal changes;

said sensing means including bistable means connected to said detector means for receiving said output pulses, said output pulses operating to reverse the state of said bistable means when the sense of the difference between said input signal and said feedback signal changes whereby the output signal from said bistable means is indicative of the sense of the difference between said input signal and said feedback signal;

differentiating means connected to said bistable means for differentiating said output signal from said bistable means;

switch means connected to said differentiating means and to said input means whereby signals from said differentiating means close said switch means to sample the input signals; and output means connected to said switch means for receiving the samples of the input signals.

References Cited

UNITED STATES PATENTS 2,833,922  5/1958  Gerks _____ 328—115X
3,434,062  3/1969  Cox _____ 328—114X DONALD D. FORRER, Primary Examiner R. C. WOODBRIDGE, Assistant Examiner U.S. Cl. X.R.

328—116, 146, 150; 307—231, 235